G. A. LUTZ.
MEANS FOR SUPPORTING ELECTRIC DEVICES.
APPLICATION FILED APR. 13, 1906.
1,098,159.
Patented May 26, 1914.
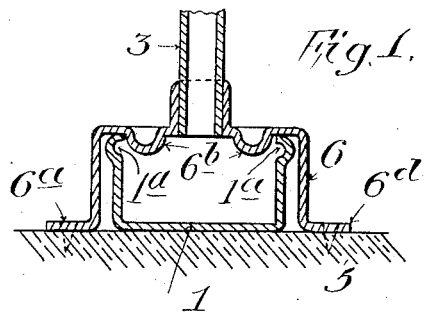
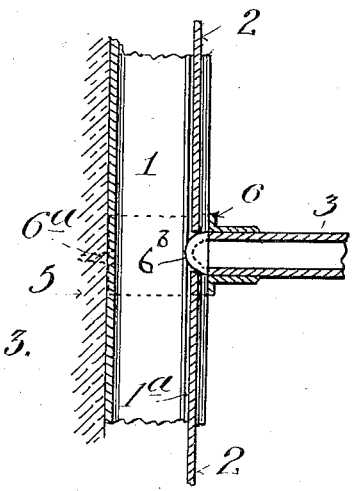
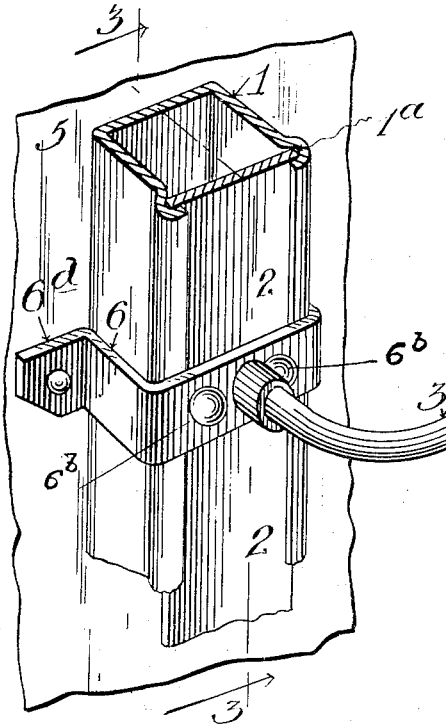
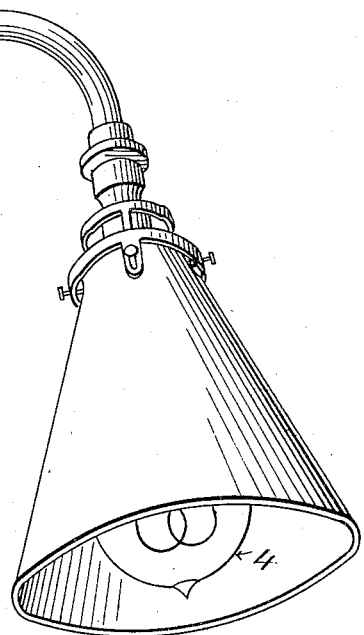
Witnesses:
Inventor
Geo. A. Lutz.
By his Attorney
T. F. Bourne

UNITED STATES PATENT OFFICE.

GEORGE A. LUTZ, OF NEW YORK, N. Y.

MEANS FOR SUPPORTING ELECTRIC DEVICES.

1,098,159.　　Specification of Letters Patent.　Patented May 26, 1914.

Application filed April 13, 1906. Serial No. 311,477.

*To all whom it may concern:*

Be it known that I, GEORGE A. LUTZ, a citizen of the United States, and a resident of New York city, borough of Brooklyn, State of New York, have invented certain new and useful Improvements in Means for Supporting Electric Devices, of which the following is a specification.

My invention relates to improved means for supporting electric lamps, and other devices in conjunction with conduits for electric wires, and is particularly applicable for use in show windows of stores, and the invention is designed more especially for use in conjunction with metallic conduits of the class having removable covers.

The invention consists in the novel details of improvement that will be more fully hereinafter set forth and then pointed out in the claims.

Reference is to be had to the accompanying drawings forming part hereof, wherein—

Figure 1 is a cross section of a conduit provided with my improvements; Fig. 2 is a perspective view of the conduit and the arm supported in connection therewith; and Fig. 3 is a vertical section on the line 3, 3, in Fig. 2.

The numeral 1, in the drawings, indicates a conduit adapted to receive electric wires, and it is shown provided with a duct or channel for the wires and having opposed grooves 1ᵃ to receive covers 2.

3 is an arm or support for an electric lamp 4 to which the fixtures for the lamp may be connected in well known manner. Said arm is shown in tubular form for the passage of wires to the terminals of the lamp. The conduit 1 may be secured to a wall or other support 5 in any suitable manner. The arm 3 is to be supported in line with the open side of the channel in the conduit so that the wires from the conduit may be passed through the arm, and in Fig. 1 I have shown the arm 3 as secured to a clip 6 adapted to straddle the conduit 1 and provided with lugs or feet 6ᵃ to be screwed or otherwise fastened to the support 5. By this means the arm 3 can be adjusted along the conduit to any desired position and there secured, and the clip 6 may be so proportioned to the size of the conduit as to bear firmly upon the latter when fastened to the support 5.

To prevent the covers from being pushed into contact with the wires that pass through the arm 3, an abutment is provided to be engaged by the covers. For this purpose the clip 6 is shown bent inwardly at 6ᵇ so as to be engaged by the covers. But the abutment can be formed in any suitable manner.

While I have shown my improvements as applied in connection with conduits having grooves at the edges providing outwardly extending webs, it will be understood that the same may be used with channel-like conduits having removable covers of any well known or desired character.

My improvements will be particularly useful in show windows of stores, and in show cases, where the conduits are exposed and placed vertically or in other desired positions, and the covers 2 may be made of flexible material to facilitate their connection with the conduit, or may be of any suitable character attached to the conduit in any desired manner, and such covers can be readily attached on opposite sides of the electric fixture to be applied to the conduit, whereby the wires contained in the conduit may be concealed and protected, and ready access to them may be had.

While I have shown an electric lamp connected with the conduit it will be understood that any suitable electric device can be substituted for said lamp.

I do not limit my invention to the precise form of the parts shown and described as they may be varied, within the scope of the appended claims, without departing from the spirit thereof.

Having now described my invention what I claim is:

1. The combination of a conduit having one side open, with a fixture for an electric device, a clip for supporting said fixture formed of metal shaped to straddle the conduit and having an opening communicating with a bore in said fixture for the passage of a conductor, said clip having perforated lugs for securing said clip to a support adjacent the conduit, and covers fitted on the open side of the conduit on opposite sides of said clip.

2. The combination of a conduit having one side open, with a fixture for an electric device, a clip for supporting said fixture formed of metal shaped to straddle the conduit and having an opening communicating with a bore in said fixture for the passage of a conductor, said clip having perforated lugs for securing said clip to a support adjacent the conduit, and covers fitted on the open side of the conduit on opposite sides of said clip, said clip having one or more abutments to engage adjacent ends of the covers.

GEO. A. LUTZ.

Witnesses:
  LENA SWINTON,
  T. F. BOURNE.